United States Patent [19]
Ross

[11] Patent Number: 5,089,147
[45] Date of Patent: Feb. 18, 1992

[54] UNDERDRAIN FOR GRANULAR MEDIUM FILTER

[75] Inventor: David S. Ross, Lorain, Ohio

[73] Assignee: Zimpro Passavant Environmental Systems, Inc., Rothschild, Wis.

[21] Appl. No.: 694,180

[22] Filed: May 1, 1991

[51] Int. Cl.⁵ .............................................. B01D 24/46
[52] U.S. Cl. .................................... 210/793; 210/794; 210/274; 210/275; 210/293
[58] Field of Search ............... 210/274, 275, 293, 793, 210/794

[56] References Cited

U.S. PATENT DOCUMENTS

| Re. 28,456 | 7/1975 | Ross | 210/80 |
|---|---|---|---|
| 2,710,692 | 6/1955 | Kegel et al. | 210/293 |
| 2,745,553 | 5/1956 | Riddick | 210/293 |
| 2,855,364 | 10/1958 | Roberts | 210/274 |
| 3,459,302 | 8/1969 | Ross | 210/796 |
| 3,516,930 | 6/1970 | Ross | 210/694 |
| 3,587,861 | 6/1971 | Ross | 210/277 |
| 3,792,773 | 2/1972 | Ross | 210/779 X |
| 3,817,378 | 6/1974 | Ross | 210/744 |
| 3,840,117 | 10/1974 | Ross | 210/794 |
| 3,954,620 | 5/1976 | Nebolsine | 210/293 |
| 4,032,443 | 6/1977 | Ross | 210/795 |
| 4,065,391 | 12/1977 | Farabaugh | 210/293 |
| 4,118,322 | 10/1978 | San Roman | 210/293 |
| 4,214,992 | 7/1980 | Sasano et al. | 210/274 |
| 4,627,923 | 12/1986 | Ross | 210/744 |
| 4,648,969 | 3/1987 | Swanson | 210/293 |
| 4,693,831 | 9/1987 | Garzonetti | 210/744 |
| 4,818,414 | 4/1989 | Ross | 210/744 |
| 4,995,990 | 2/1991 | Weston | 210/793 |

Primary Examiner—Stanley S. Silverman
Assistant Examiner—Cynthia L. Nessler
Attorney, Agent, or Firm—Tipton L. Randall

[57] ABSTRACT

An improved apparatus and method for operating a granular medium filter is disclosed. The apparatus comprises an improved underdrain structure made up of a plurality of rectangular compartments which allows the filter bed to be "air pulsed" as well as backwashed for thorough cleaning of the bed. Nozzles are positioned within the rectangular compartments and directed vertically into the filter bed. Fluid from the nozzles helps to break up the bed during backwashing as well as countereact size classification of the medium during this process. The method of operating a filter with the improved underdrain structure is also described.

16 Claims, 3 Drawing Sheets

UNDERDRAIN FOR GRANULAR MEDIUM FILTER

FIELD OF THE INVENTION

This invention relates to an apparatus and a process for filtering a liquid through a bed of granular medium.

DESCRIPTION OF RELATED ART

Very effective wastewater filters have been developed and described in applicant's prior U.S. Pat. Nos. 3,459,302; 3,516,930; 3,587,861; 3,792,773; 3,817,378; 3,840,117; 4,032,443; 4,627,923; 4,818,414 and Re. 28,458. These patents are incorporated by reference herein to the general art to which the present invention is directed.

A very effective means for reducing the frequency of backwashing is described in Ross U.S. Pat. No. 3,817,378. In this reference, at the time filter bed porosity decreases due to separated and captured solids, and liquid accumulates above the filter bed, controlled volumes of air are forced upward through the medium in intermittent pulses of short duration. Some variations of this procedure are known as "air pulse". A portion of the separated filtered solids is forced into liquid suspension above the filter bed, while another portion is concentrated by surface medium movement into localized sites within the bed itself. Thus, some of the solids are "stored" within the filter bed, significantly reducing the quantity of solids which produce the flow resistance at the bed surface. This filter porosity reclaiming operation is generally repeated a number of times between backwashes, greatly extending the filtration time before backwashing is required. A drawback for this procedure is that air being compressed will take the line of least resistance through the filter bed and the bed or bed surface is not evenly pulsed by this method.

In my U.S. Pat. No. 3,840,117 an air and liquid distributing device located in the underdrain of a granular medium filter is disclosed which overcomes some of the problems associated with the U.S. Pat. No. 3,817,378 invention. This underdrain structure contains a plurality of separate chambers open at the bottom and with small openings at the top. Rising liquid in the underdrain traps air in the chambers and forces it through the small top openings giving evenly distributed "air pulses" throughout the whole filter, periodically reclaiming the porosity of the bed. Forcing liquid up through the small openings during backwashing also provides even distribution of liquid jets to disintegrate clumps of medium and washing of the filter medium.

A variation of the "air scour" and "air pulse" design is disclosed in my U.S. Pat. No. 4,627,923 where a granular medium bed filter with bed supported on a screen is described. A plurality of vertical hydraulic jets are periodically created within and/or below the bed to suspend solids above the bed and fold solids into the bed medium, as well as assist in cleaning the support screen and granular medium during a backwashing cycle. Hydraulic jets above the filter bed also create currents in the liquid to maintain solids in suspension during the filter run. Chemical cleaners can be added to the filter bed by the jet creating means within and/or below the bed. Air may be forced through the jets to break up the bed prior to a chemical cleaning cycle.

Garzonetti, in U.S. Pat. No. 4,693,831, discloses a method for controlling the pulsing of a granular medium filter based on determination of the rise rate of liquid level above the filtration medium. Either air or liquid is used to pulse the filter bed.

In U.S. Pat. No. 4,995,990 Weston describes perforated lateral conduits for supplying air and water for scouring and backwashing granular medium filters. The conduits are divided into axially parallel ducts, one for air and one for water, which supply these fluids to the granular medium filter.

Although the pulse-bed granular medium filters described above operate successfully to remove particulate matter and organics from wastewaters, some operational problems remain with the designs now in use. The system described in my U.S. Pat. No. 3,840,117 has, in one embodiment, a cover plate atop the plastic pipe sections with orifices in the plate positioned at the center of each of the square openings in the lattice work of the screen hold down grating. The air from the pulsing action and water jet from the backwashing steps augers upwardly, breaking up the medium in an inverted cone shape above these orifice. A high velocity upward liquid jet flow is accompanied by a lower velocity downward liquid flow which can carry deleterious material and deposit it around the orifice. The portion of the medium bed outside the cone can gradually solidify as dirt and grease collect there, reducing filter performance.

In addition, sheet-like material, such as plastics, leaves, etc., can enter the filter cell. Upon pulsing or backwashing, the sheet-like pieces are carried down through the granular medium bed and may lodge along side and under the hold down grating. These materials act as a check valve, allowing air and water to be pulsed upward through the bed but closing down to prevent flow of wastewater down through the filter bed, thereby reducing filter efficiency. Attempts to remove these materials by backwashing are not successful since the backwash liquid flows only through the orifices in the cover plate below the medium support screen.

To maintain the advantages of air pulsing, jet pulsing and backwashing to regenerate the filter bed, while providing for flushing of the screen and removal of sheet-like material from the screen and bed, while restoring the efficiency of the filter bed, the following improved underdrain has been invented.

SUMMARY OF THE INVENTION

The underdrain structure which can accomplish these objectives is termed the modular compartment design as shown in the attached drawings. This new underdrain structure eliminates the cover plate completely. The underdrain remains vented to the atmosphere as before with the modular compartments acting as hydraulic pistons to "air pulse" the bed by the rising filtrate level in the underdrain cavity. The screen is supported on the upper surface of the modular compartments and thus is exposed to nearly the full area of the top of each modular compartment for pulsing, jetting, flushing and backwashing.

The modular compartments, in a preferred embodiment employing rectangular chambers, have two pipes extending through each of the compartments with holes in the pipes directed upwardly toward the screen, and located at the center of the square openings in the hold down grating above the screen. Alternatively, a matching flat grating is positioned atop the modular compartments beneath the screen to support the screen and provide a fluid-tight seal between the modular compartments and the screen. The pipe openings have nozzles which may extend the orifices quite closely to the screen to minimize energy adsorption of the jet at the jet/screen interface. Alternatively, the modular compartments can be made in smaller dimensions with a single pipe in each chamber for jet cleaning, however the larger modular compartments with multiple pipes are preferred. Filtrate liquid is pumped through these pipes to provide a plurality of jets which "augers" up through the sand bed to disintegrate agglomerated medium grains. In a filtration run after a number of air pulses, the jets first "auger" the bed to break it up, then filtrate is forced up from the underdrain to backwash the filter bed. The flow of filtrate up through the modular compartment underdrain flushes the screen and bed, removing even the sheet-like pieces of plastic, leaves, etc., as well as other particles trapped by the bed. The jetting may be operated simultaneously with backwash to counteract size classification of the bed material. After the backwash, the bed settles back on the screen for another filter run. Chemical cleaners can be introduced through the jet piping network as well. Also, an additional pipe for compressed air can be added to the underdrain to supply pressurized air to each rectangular portion of the underdrain structure via openings in the air conduit. This configuration is useful during a chemical cleaning cycle for internally scouring the bed with minimal dilution of the cleaning solution.

DESCRIPTION OF THE PREFERRED EMBODIMENTS

Figure 1:
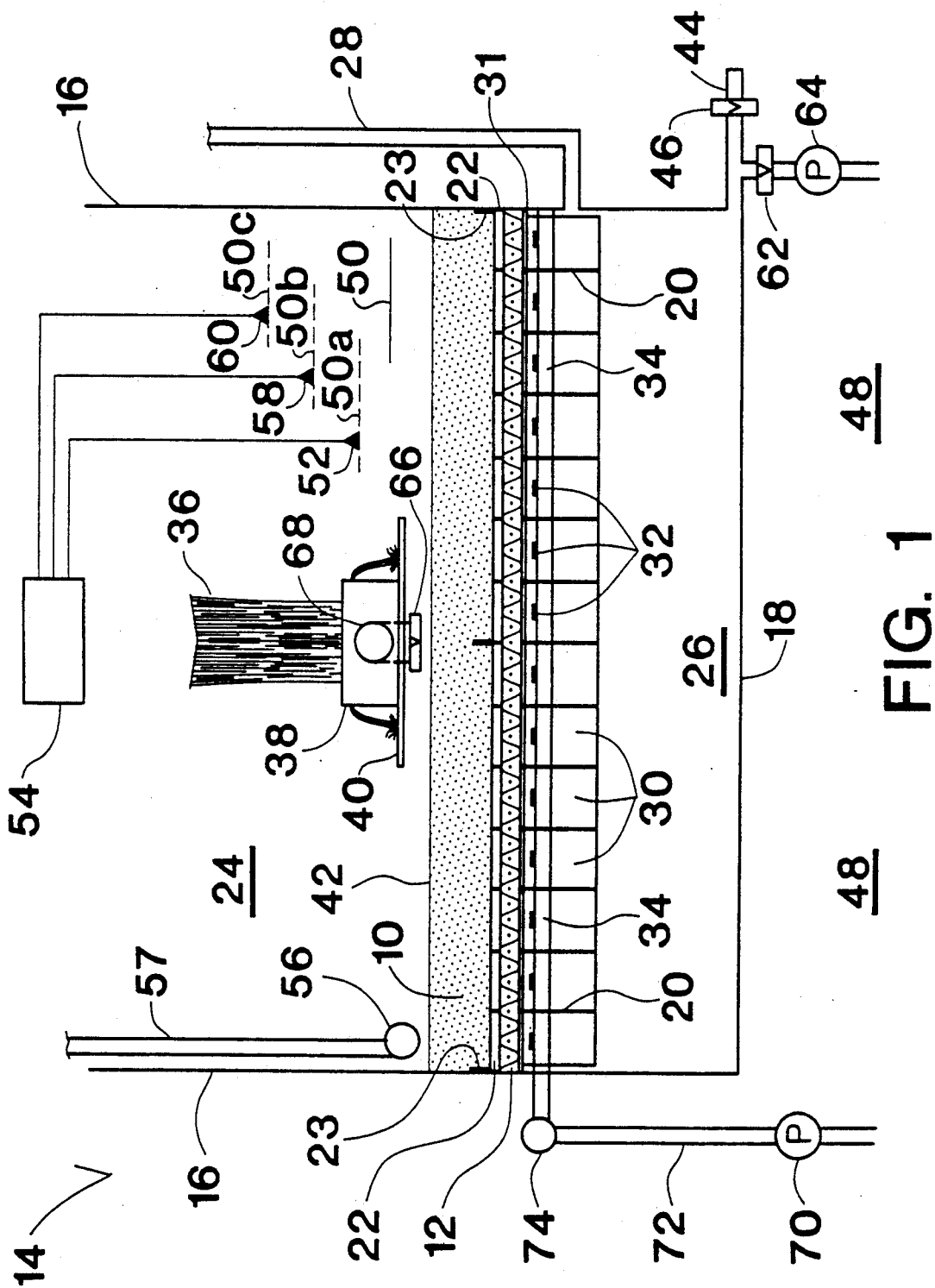
FIG. 1 is a side elevational view showing in somewhat schematic form a granular medium filter cell to which the present invention is applied.

The method and apparatus for pulsing, backwashing and cleaning a granular medium filter according to this invention is illustrated with reference to the Figures. Certain features of a typical filter adapted to practice the invention are shown in partial cross-section in FIG. 1. The invention is not limited to the particular configuration shown in the figures however.

A bed 10 of granular medium such as sand is supported on a screen 12 within a filter tank cell 14 having tank walls 16 and a tank bottom 18. An underdrain structure 20 supports the screen 12 while a hold down grating 22 secures the screen 12 in place from above. The grating 22 is held in place by adjustable hold down means 23 secured to tank walls 16. The bed divides the tank cell 14 into a head space 24 above the bed and an underdrain cavity 26 below the filter bed. The underdrain cavity 26 is vented to the atmosphere by a vent conduit 28. The underdrain structure 20 comprises an air and/or liquid distributing device made up of a plurality of generally vertically extending modular compartments or chambers 30 below the fine mesh screen 12. The compartments or chambers 30 may be generated by intersecting a first plurality of mutually parallel, generally rectangular partitions perpendicularly with a second plurality of mutually parallel, generally rectangular partitions to produce modular compartments which, in this instance, can be described as an "egg crate" structure. Chambers of other geometrical shapes would function equally well in the underdrain structure.

The lower ends of the chambers are open to the underdrain cavity 26 while the upper ends of the chambers are open to the under side of the screen 12. The upper ends of the chambers 30 may optionally be capped by a flat grating 31 designed to support the screen as well as match up with the upper hold down grating 22 to prevent air from moving between compartments during pulsing. The underdrain structure also contains a set of nozzles 32 directed upwardly toward the under side of the screen 12. The nozzles are supplied with fluid by an array of conduit 34 which traverse the underdrain structure adding support to the "egg crate" structure.

In FIG. 1, influent liquid to be filtered enters the head space 24 above the filter bed 10 through an inlet weir 36 controlled by a valve (not shown). Influent liquid is directed to a distribution trough 38 and then to splash plates 40 or other types of distributor and then to the upper bed surface 42. Solids suspended in the liquid are retained at the surface of the filter bed 10 as the filtered liquid passes down through the bed and through the screen 12 and the underdrain structure 20 into the underdrain cavity 26. The filtrate is discharged from the underdrain cavity 26 through a conduit 44 controlled by a valve 46 to final disposal or further treatment. A portion of the filtrate is retained in a clearwell 48, where it is stored for backwashing and pulsing the filter bed 10.

As solids collect on and within the filter bed medium 10, the liquid level 50 above the bed upper surface 42 rises to a first selected level 50a, activating a first level sensor switch 52 connected to a controller 54 which activates a diffuser 56 extending over the bed surface 42 for the purpose of creating currents in the wastewater above the bed surface. The diffuser 56, generally a conduit with a number of small holes, supplied with air by a conduit 57, creates fine bubbles which cause the liquid above the diffuser to be less dense and thereby causes currents within the wastewater contained in the head space 24. The currents sweep over the bed surface 42 and tend to lift and suspend the solid particles collected on the surface during filtration, as well as holding in suspension solid particles removed from the filter medium bed 10 during the pulse cleaning operation described later. This creation of currents in the liquid above the filter bed is termed the "air scour" method for lifting particulate material trapped on the filter bed surface 42. The diffuser may be operated continuously or intermittently to conserve energy.

As wastewater continues to enter the filter cell, the liquid level 50 rises to a second selected level 50b activating a second level sensor switch 58 which initiates an air pulsing cycle for the filter cell. A third level sensor switch 60, which initiates the backwash cycle, may be deactivated during each pulsing cycle to prevent premature backwash.

The air pulsing cycle for the cell occurs as follows. Effluent discharge from the conduit 44 ceases by closing the valve 46 and opening a valve 62 allowing a pump 64 to transfer filtrate from the clearwell 48 into the underdrain cavity 26. As the cavity fills, excess air in the underdrain cavity 26 is expelled through the vent conduit 28. When the liquid level in the underdrain cavity 26 reaches the lower edges of the underdrain structure 20, and rises in each of the underdrain support chambers 30, this compresses the trapped air to a point just sufficient to overcome the resistance of the bed and forces the air trapped in these chambers 30 through the screen 12 and upward through that portion of the filter bed 10 above each of the chambers 30. The passage of air up through the filter bed increases the porosity of the bed and causes some of the solids retained on the surface to be folded into the bed proper, further increasing bed porosity. The individual chambers 30 ensure that air is forced evenly through the entire filter bed 10. The air pulsing cycle is continued until the filtrate pumped into the underdrain cavity 26 by the pump 64 approaches the screen 12. Influent liquid continues to enter the filter cell during the air pulsing cycle.

Following an air pulsing cycle the pump 64 shuts off, the pump valve 62 closes and the effluent valve 46 is opened, allowing the underdrain cavity 26 to drain. The air pulsing cycle restores a substantial portion of the original porosity of the cell filter bed and flow of liquid through the bed is increased. The air pulsing cycle functions to decrease the liquid level above the filter medium bed 10. The backwash level sensor 60 is reactivated following each air pulsing cycle. After initiation of the first pulsing cycle for the filter cell, the controller 54 activates additional air pulsing cycles a predetermined intervals of time, head space liquid level permitting. The pulsing of the filter cell continues until either a predetermined number of pulsing cycles has occurred or the liquid level 50 above the filter bed surface 42 rises to a third predetermined level 50c, initiating a backwash cycle. The predetermined maximum number of air pulsing cycles performed before backwash may be fixed or vary according to influent flow. Alternatively, a backwash cycle may be initiated after a predetermined filtration time.

In the case where initiation of the backwash cycle is controlled by the level sensor 60, solids accumulate on and in the filter bed to the extent that the air pulsing of the filter cell becomes less and less effective in reducing the liquid level above the filter bed. In this case the liquid level 50 rises to a third selected level 50c, activating the level switch 60 which initiates a backwash cycle for the filter cell. Influent flow to the filter cell via the weir 36 ceases by closing the influent control valve (not shown). A valve 66 in a conduit 68 leading from the distribution trough 38 opens to remove influent liquid above the bed to the upper edge of the trough 38, as well as backwash liquid from the filter cell. The effluent valve 46 closes, the pump valve 62 opens and the pump 64 delivers filtrate to the underdrain cavity 26 forcing excess air through the vent 28 and compressing trapped air and finally filtrate up through the filter bed medium 10 at a cleansing velocity. At the same time as the pump 64 commences the backwash liquid flow, an array of nozzles 32 below the screen 12 provides upwardly directed liquid jets which "auger" up through the filter bed to break up incrustations. This "augering" action occurs as first air and then filtrate passes upwardly through the screen and filter bed. The liquid is supplied to the nozzles by a pump 70 which delivers liquid from the clearwell 48 via a conduit 72 to a manifold 74 which feeds the array of conduit 34 supplying the nozzles 32.

The backwash flow of filtrate continues and the filtrate washes the solids stored in and on the bed from the filter medium bed, carrying the solids over the top edge of the distribution trough 38 and out from the filter cell via the conduit 68 to disposal. The open tops of the cylinders 30 produces an even flow of backwash liquid up through the entire screen and filter bed which dislodges any sheet like or deleterious material from the filter bed. The vertical augers provided by the nozzles 32 counteracts any size classification of the bed medium during the backwashing cycle.

The control valve 66 in the conduit 68, which removes backwash liquid from the trough 38, is open only during the backwash cycle. The diffuser 56 continues to provide currents in the liquid above the filter bed during the backwash cycle which assists in carrying solids over the top edge of the distribution trough 38 and out of the filter cell. After the specified backwash cycle duration the pumps 64 and 70 cease operation and the effluent valve 46 opens allowing liquid to flow from the filter and another filtration cycle commences.

Figure 2:
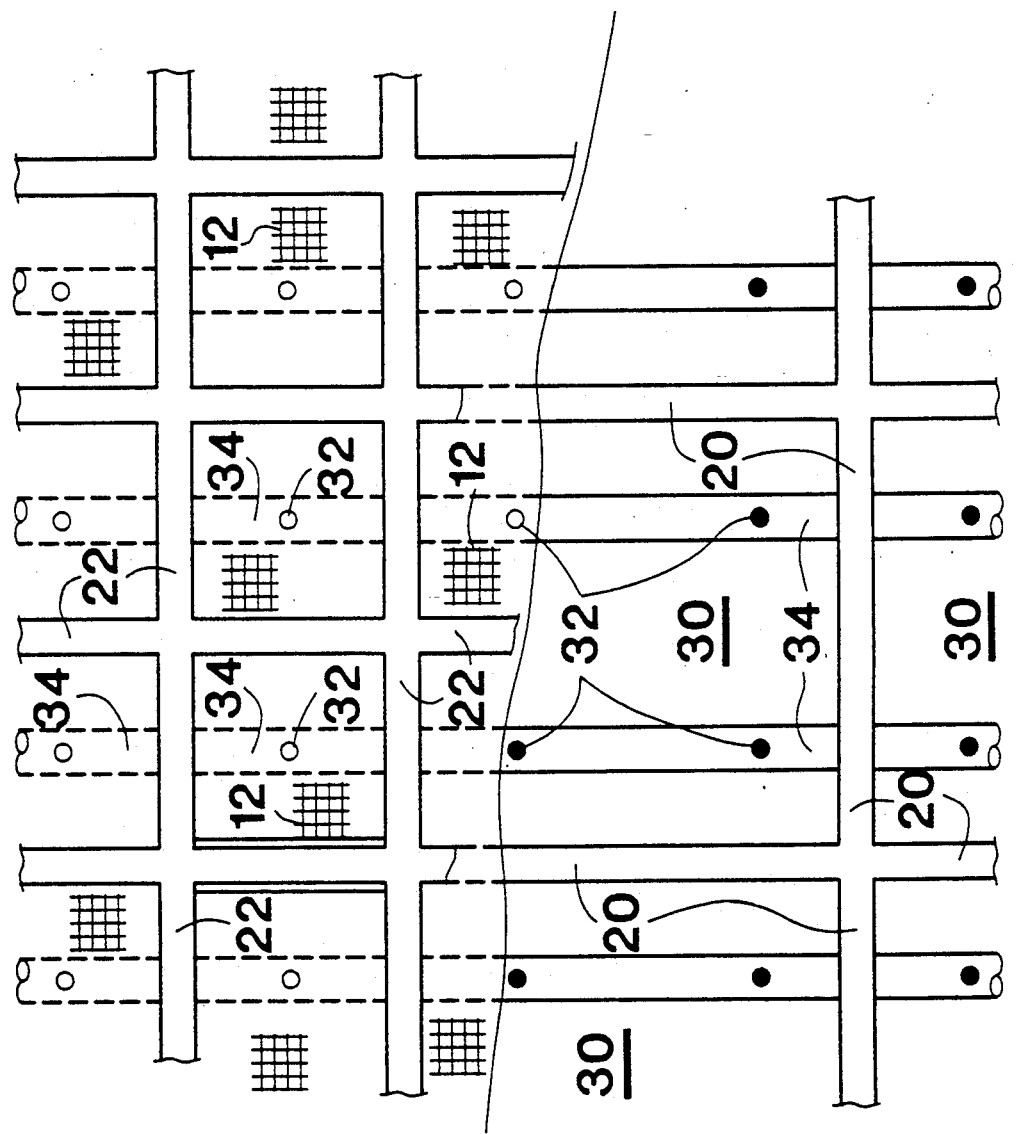
FIG. 2 is a top view of one embodiment of the grating, screen and underdrain distribution structure of the invention.

Referring to FIG. 2, a cut-away view of one embodiment of the underdrain assembly, screen and hold down grating is shown. Each chamber 30 contains a pair of conduits 34 each of which has two nozzles 32 directed upwardly toward screen 12. The hold down grating 22 above the screen is sized and positioned such that a nozzle is positioned at the center of each opening in the grating 22. The optional flat grating 31 located atop the chambers 30 but below the screen 12 exactly matching the hold down grating 22 is omitted from FIGS. 2 and 3 for clarity.

Figure 3:
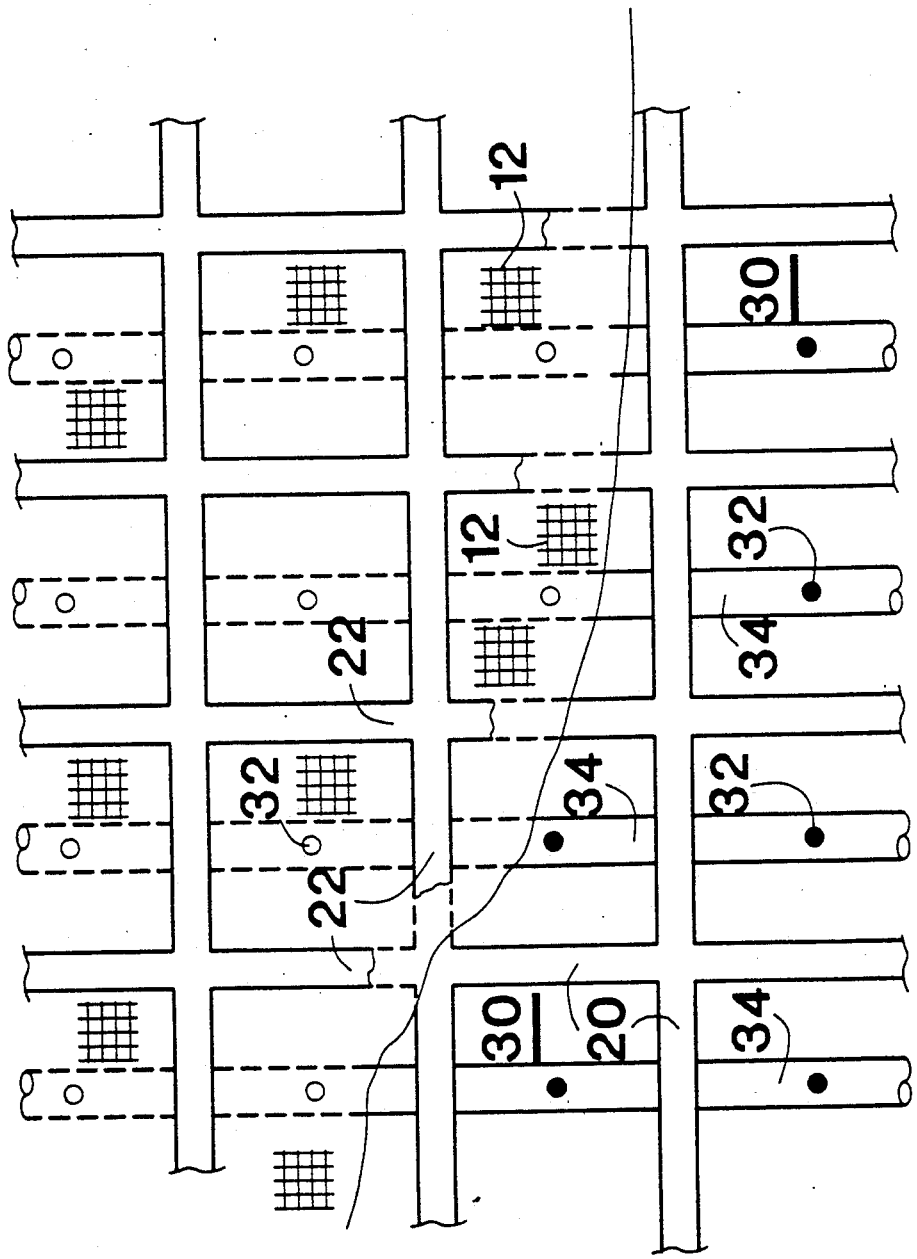
FIG. 3 is a top view of another embodiment of the grating, screen and underdrain distribution structure of the invention.

FIG. 3 is a cut-away view of another embodiment of the invention where a single conduit 34 and nozzle 32 is located in each chamber 30. The hold down grating 22 again is positioned such that the nozzle 32 is directed at the center of each opening in the grating. Matching flat grating 31 located below the screen 12 is again omitted for clarity. The entire screen area not covered by the hold down grating 22 thus is exposed to the full upward flow of backwashing liquid which flushes out any sheet-like or deleterious material which may have accumulated at the interface between the screen and the bed medium. The sequence of operational steps for the filter cell is the same for the embodiments shown in FIGS. 2 and 3. The conduit and nozzle assembly within the underdrain structure provides a unique avenue for supplying either gas or liquid to the underside of the filter medium bed. Chemical cleaner can be directed evenly throughout the underdrain structure and up through the filter bed by the nozzles.

Another alternative is the inclusion of a gas carrying conduit through the chambers which can provide a gas (air) to the underside of the bed when the filter is flooded. This is particularly useful for internally scouring the bed during cleaning with minimal dilution of the chemical cleaning solution. This can be accomplished by providing a gas supply to the conduit and nozzle system already used for liquid jet production, or by adding a dedicated gas line to the underdrain chambers with an aperture in that line within each of the chambers.

I claim:

1. In a waste effluent filter including a tank having a lower portion; a generally flat fine mesh element supported adjacent said lower portion and having a multitude of apertures; an underdrain cavity adjacent said lower portion and under said fine mesh element and generally coextensive with said fine mesh element; a filter bed of granular material having an upper surface, a parallel lower surface on said generally flat fine mesh element, a generally uniform depth between said fine mesh element and said upper surface and an effective particle size at least greater than the size of said apertures of said fine mesh element; means for directing effluent into said filter above said upper surface; means for draining from said underdrain cavity, filtrate which has passed through said filter bed; means for allowing air to enter said underdrain cavity; and means for forcing liquid into said underdrain cavity whereby said air is compressed in said underdrain cavity and forced upwardly through said filter bed, the improvement comprising:

an air distributing device secured in said underdrain cavity, said device comprising means defining a plurality of generally vertically extending open-ended compartments below said fine mesh element and positioned in a pattern coextensive with said bed with a majority of said compartments being surrounded by adjacent compartments, each of said compartments having an open inner cavity, a lower open end opening into said underdrain cavity and having a first area, and an upper open end adjacent said fine mesh element and having a second area essentially equal said first area, whereby when liquid is forced into said underdrain cavity, said liquid closes said lower open ends and then forces air entrapped in said compartments upwardly though said compartments, upper open ends and through said fine mesh element and said filter bed; a set of nozzles near to, but below, said fine mesh element and evenly distributed throughout said underdrain cavity; and means for periodically forcing fluid through said set of nozzles during a backwashing cycle for said filter bed by liquid filtrate from said underdrain cavity, whereby said bed is agitated to break up agglomerated bed material.

2. An apparatus according to claim 1 wherein said generally flat fine mesh element is supported by said air distribution device secured in said underdrain.

3. An apparatus according to claim 1 wherein said air distributing device comprises a lattice work structure produced by intersecting a first plurality of mutually parallel, generally rectangular partitions perpendicularly with a second plurality of mutually parallel, generally rectangular partitions forming a plurality of generally rectangular chambers therein.

4. An apparatus according to claim 1 wherein said set of nozzles below said fine mesh element is located within said vertically extending compartments.

5. An apparatus according to claim 1 wherein means for forcing fluid through said set of nozzles comprises a conduit to each nozzle and pumping means for supplying said fluid thereto.

6. An apparatus according to claim 5 wherein said fluid is effluent filtrate from said filter.

7. An apparatus according to claim 1 wherein a single nozzle is located within each vertically extending compartment.

8. An apparatus according to claim 1 wherein a plurality of nozzles is located within each vertically extending compartment.

9. An apparatus according to claim 8 wherein four nozzles are located within each vertically extending compartment.

10. An apparatus according to claim 1 further comprising a hold down grating for said mesh with apertures therein, said grating positioned above said mesh element.

11. An apparatus according to claim 10 wherein discharge from said nozzles is directed at or near the center of s id apertures in said hold down grating.

12. An apparatus according to claim 10 further comprising a flat grating matching said hold down grating, said flat grating positioned atop said air distributing device beneath said screen to support said screen and provide a fluid-tight seal between said distribution device and said screen.

13. An apparatus according to claim 1 further comprising current creating means above said filter bed surface for creating currents within said effluent above the filter bed during a filtration run.

14. A method of operating a liquid effluent filter having a filter bed with an upper surface and formed of particulate material, an underdrain cavity below said bed, and a perforated bed support element over said cavity to allow generally free flow of liquid in both directions through said support element, said method comprising the steps:

(a) providing a plurality of open-ended compartments disposed below said support element, each of said compartments having an open inner cavity and communicating by an upper open end with said bed and support element and communicating by a lower open end with said underdrain cavity, and providing a generally free flow of liquid into and from said compartments;

(b) allowing said liquid to filter through said bed and support element into said underdrain cavity;

(c) allowing air to accumulate in said compartments during said filtering step;

(d) forcing liquid into said underdrain cavity until air is trapped in said compartments; and (e) continuing said forcing step until some entrapped air from each of said compartments is compressed and forced from said upper open end of said compartments by said liquid.

15. A method according to claim 14 further comprising the step of creating currents in said liquid above said filter bed by current creating means whereby particulate material from said upper bed surface is lifted into suspension to improve flow through said filter bed.

16. A method of backwashing a liquid effluent filter having a filter bed with an upper surface and formed of particulate material, an underdrain cavity below said bed, and a perforated bed support element over said cavity to allow generally free flow of liquid in both directions through said support element, said method comprising the steps:

(a) allowing said liquid to filter through said bed and support member in a first direction and into said underdrain cavity;

(b) backwashing said bed by passing a backwashing liquid in a second direction opposite to said first direction; and (c) causing said backwashing liquid to flow through a plurality of open-ended compartment disposed below said support element, each of said compartments having an open inner cavity and communicating by an upper open end with said bed and support element and communicating by a lower open end with said underdrain cavity and providing a cleansing flow of backwashing liquid in a generally vertical direction through said support element and into said bed to remove particulate matter and sheet-like material therefrom, and simultaneously causing said backwashing liquid to flow as separate high velocity jets passing in a generally straight vertical direction through said support member and into said bed from positions below said bed, said jets being closely spaced to provide energy to disintegrate adhering bed medium particles and counteract size discrimination within said bed during backwashing.

* * * * *

UNITED STATES PATENT AND TRADEMARK OFFICE
CERTIFICATE OF CORRECTION

PATENT NO. : 5,089,147
DATED : February 18, 1992
INVENTOR(S) : David S. Ross

It is certified that error appears in the above—identified patent and that said Letters Patent is hereby corrected as shown below:

In column 2, line 63, "pipesdirected" should read --pipes directed--.

In claim 1, column 7, line 23, "compartments," should read --compartments'--.

In claim 11, column 7, line 64, "s id" should read --said--.

Signed and Sealed this

Twentieth Day of April, 1993

Attest:

MICHAEL K. KIRK

*Attesting Officer*    Acting Commissioner of Patents and Trademarks